May 27, 1958 S. M. NAMPA ET AL 2,836,131
FREIGHT LOADING APPARATUS
Original Filed Sept. 25, 1948 6 Sheets-Sheet 1
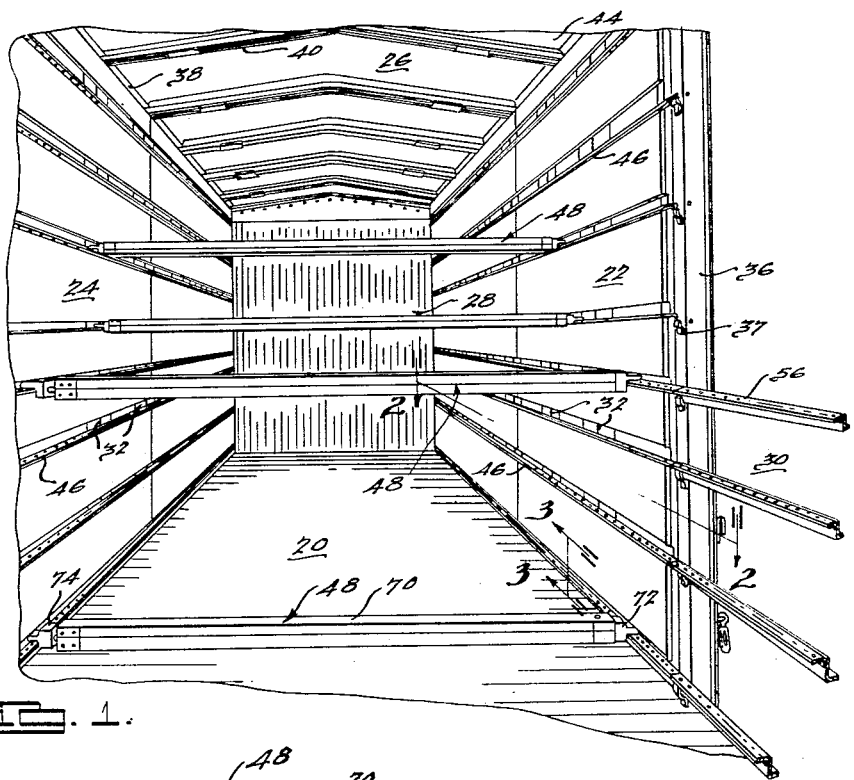
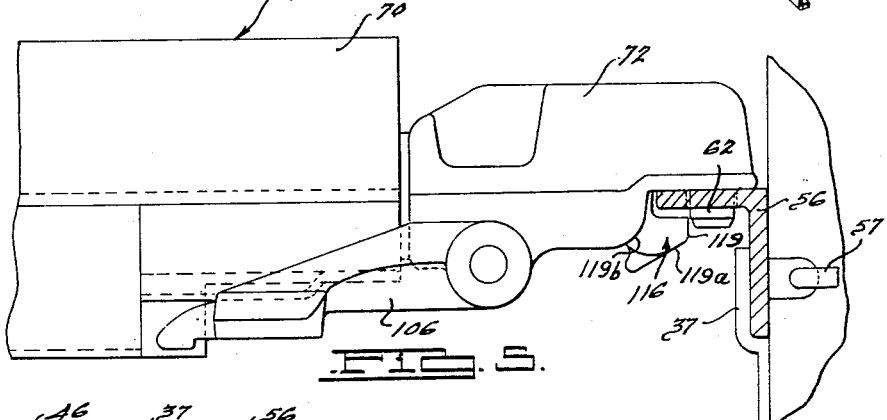
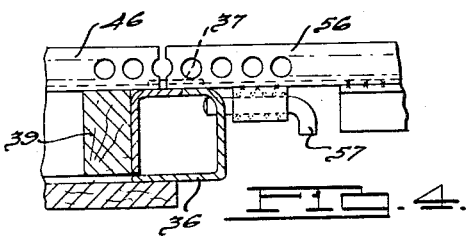
INVENTORS
Sulo Michael Nampa
Henry Lee Dunlap
BY Barnes, Dickey & Pierce
ATTORNEYS.

May 27, 1958   S. M. NAMPA ET AL   2,836,131
FREIGHT LOADING APPARATUS
Original Filed Sept. 25, 1948   6 Sheets-Sheet 2
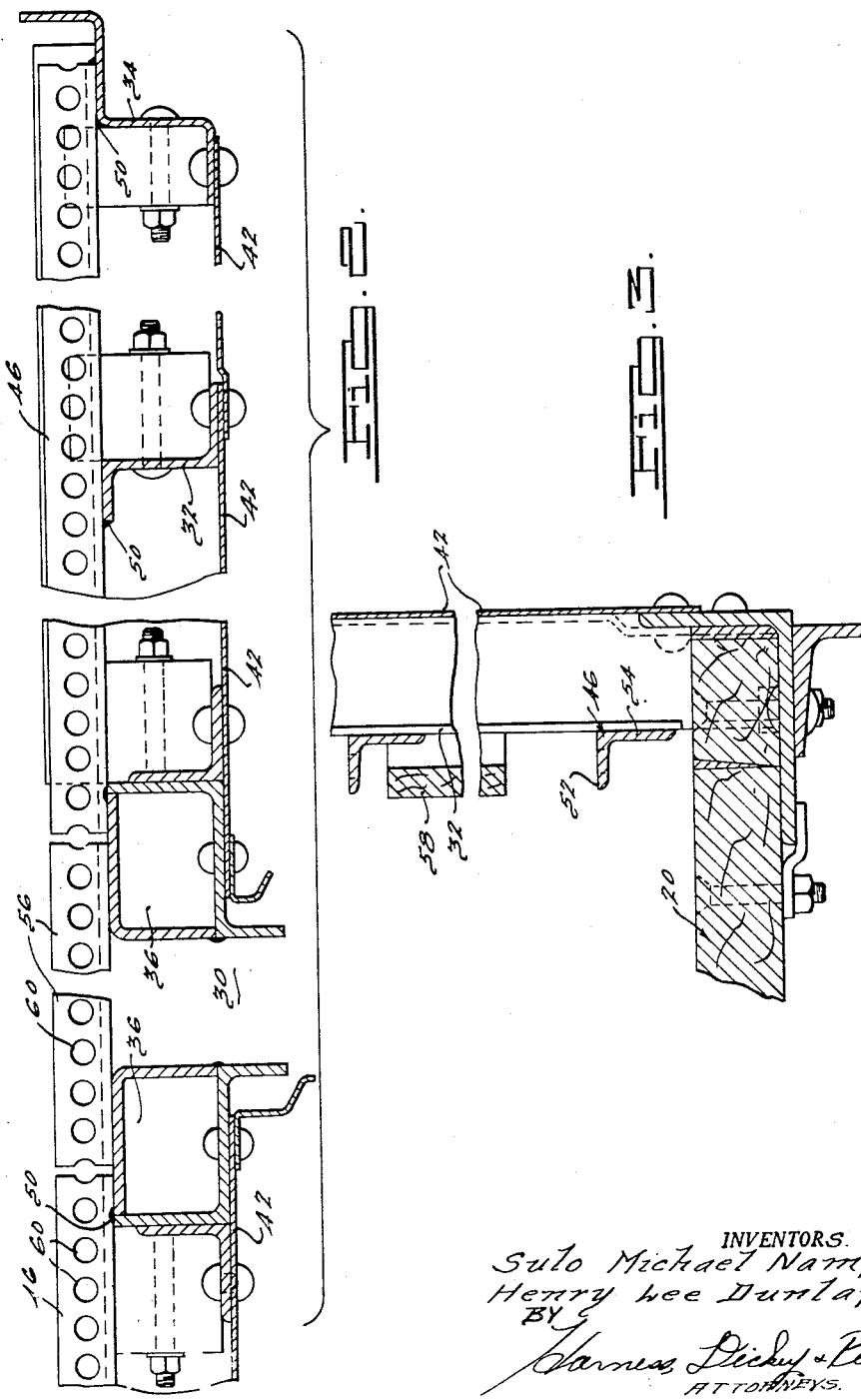
INVENTORS.
Sulo Michael Nampa
Henry Lee Dunlap.
BY
Barnes, Dickey & Pierce
ATTORNEYS.

May 27, 1958 S. M. NAMPA ET AL 2,836,131
FREIGHT LOADING APPARATUS
Original Filed Sept. 25, 1948 6 Sheets-Sheet 3
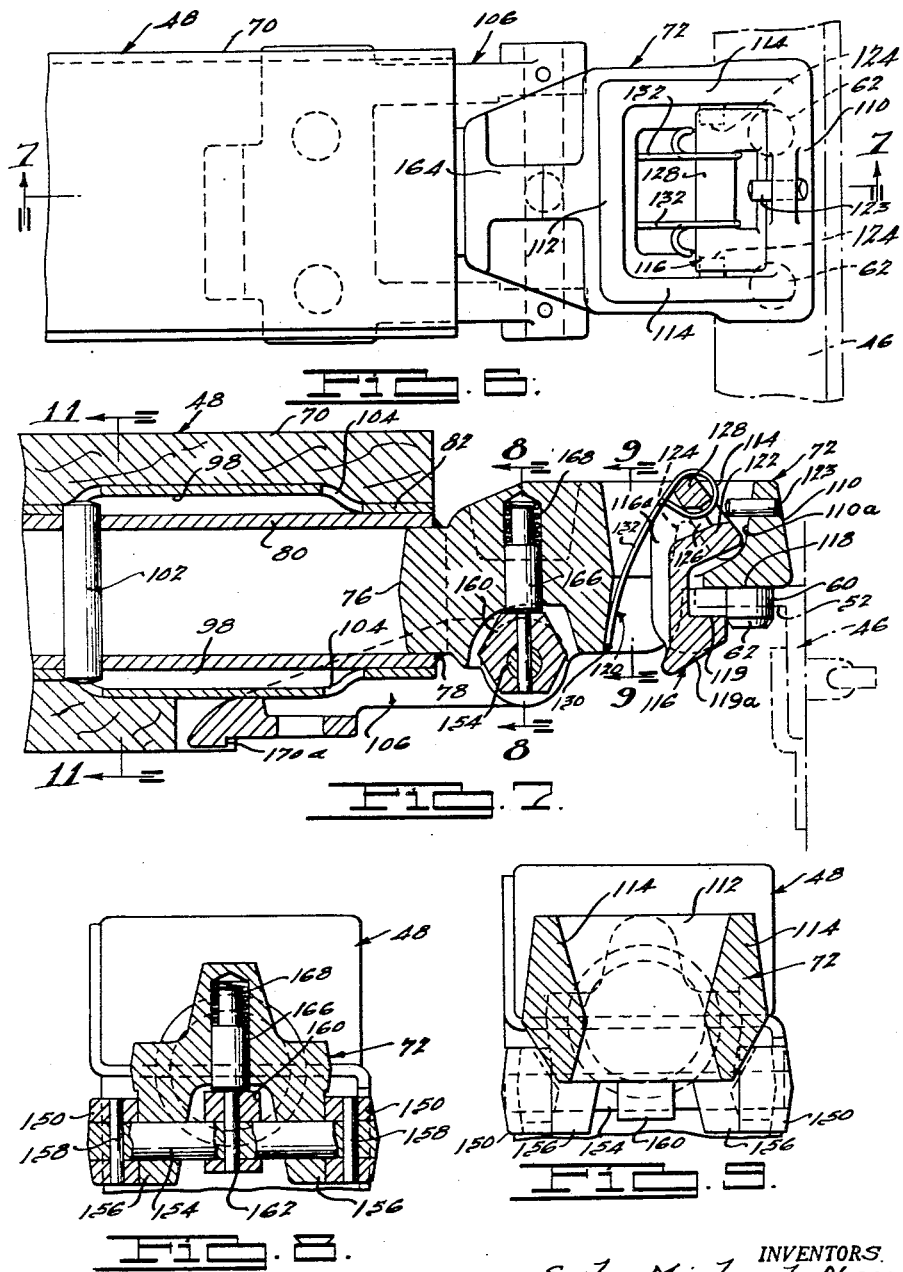
INVENTORS.
Sulo Michael Nampa.
Henry Lee Dunlap.
BY
Harness, Dickey & Pierce
ATTORNEYS.

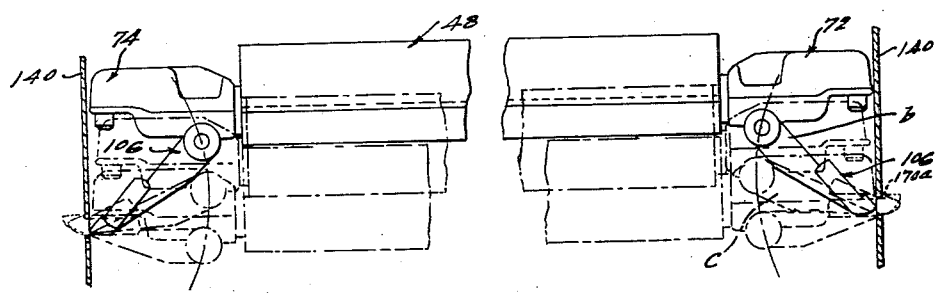
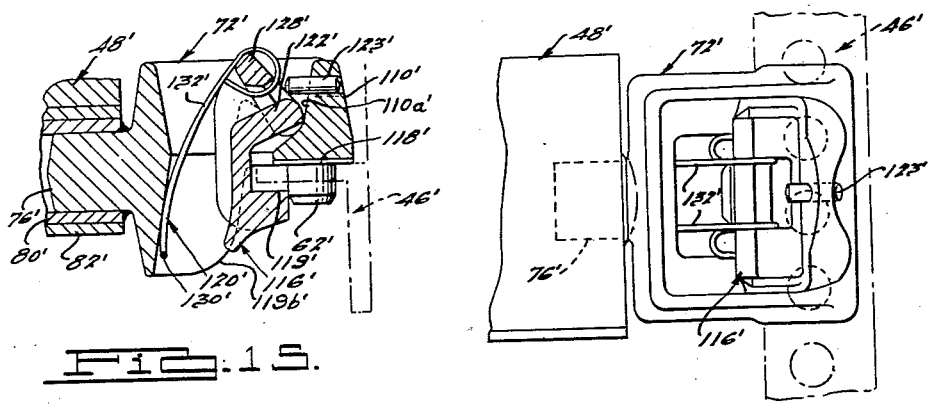
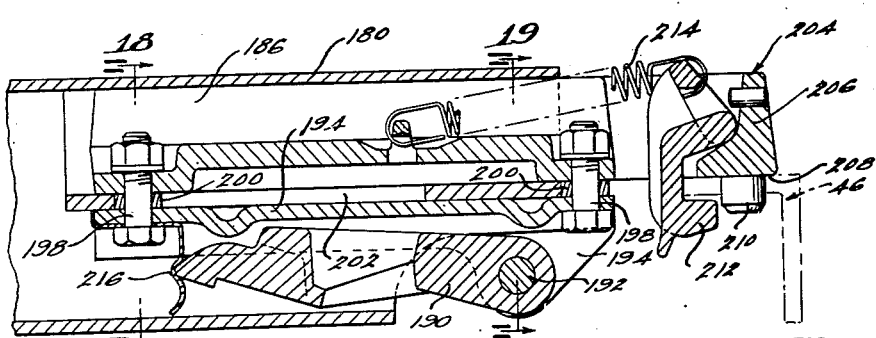

United States Patent Office 2,836,131
Patented May 27, 1958

2,836,131

FREIGHT LOADING APPARATUS

Sulo Michael Nampa, Detroit, and Henry L. Dunlap, Dearborn, Mich., assignors to Evans Products Company, Plymouth, Mich., a corporation of Delaware Original applications September 25, 1948, Serial No. 51,272, now Patent No. 2,497,683, dated February 14, 1950, and October 6, 1949, Serial No. 119,942, now Patent No. 2,725,826, dated December 6, 1955. Divided and this application November 7, 1955, Serial No. 545,196

15 Claims. (Cl. 105—369)

The present invention relates to improved loading apparatus, which is readily adjustable and widely adaptable to hold freight articles of different types in vehicles or storage spaces, and more particularly to improved equipment of this nature which is built into or combined with a vehicle, such as a railway freight car, to hold (that is, for example, to brace, support, or carry, space, wedge, or to provide shelves, partitions or bins for) a wide variety of packages or parts during shipment.

It is the purpose of the invention to provide an improved cross bar which can be attached to any of a plurality of different types of supports. In the case of railroad freight cars the cross bar supports are ordinarily built into the car and form a non-removable part of it. In its preferred form, the invention provides a cross bar which can be used in both of the leading types of freight supporting systems now used in the field. The invention provides cross bar structure which has an improved mode of attachment to support elements of each system and includes common members operative in both cases.

With the above as well as other and more detailed objects in view, which appear in the following description and in the appended claims, preferred but illustrative embodiments of the invention are shown in the accompanying drawings; throughout the several views of which corresponding reference characters are used to designate corresponding parts and in which:

Figure 1 is a perspective view of the interior of a freight car equipped with the present loading apparatus;

Fig. 2 is a broken view in horizontal section, illustrating a preferred structural relation between the belt line side rails and the upright side posts of the car, and taken along the line 2—2 of Fig. 1;

Fig. 3 is a fragmentary view in vertical section, taken along the line 3—3 of Fig. 1, and further illustrating a preferred connection between the side rails and the upright side posts of the car;

Fig. 4 is a fragmentary view in horizontal section, showing certain details of the present improved doorway arrangement;

Fig. 5 is a fragmentary view in side elevation illustrating further details of the doorway arrangement and further showing an end portion of the present improved convertible cross bar;

Fig. 6 is a fragmentary plan view of the structure shown in Fig. 5;

Fig. 7 is a view in vertical section, taken along the line 7—7 of Fig. 6;

Fig. 8 is a view in vertical section, taken along the line 8—8 of Fig. 7;

Fig. 9 is a view in vertical section, taken along the line 9—9 of Fig. 7;

Fig. 14 is a somewhat diagrammatic view illustrating the several successive stages involved in applying the cross bar of Fig. 13 to a wall structure of the general type shown in Fig. 12;

Fig. 15 is a fragmentary view in longitudinal vertical section of a simplified form of cross bar;

Fig. 16 is a fragmentary plan view of the bar of Fig. 15;

Fig. 17 is a fragmentary view in vertical section, showing a modified construction of convertible cross bar;

Figures 11, 12:
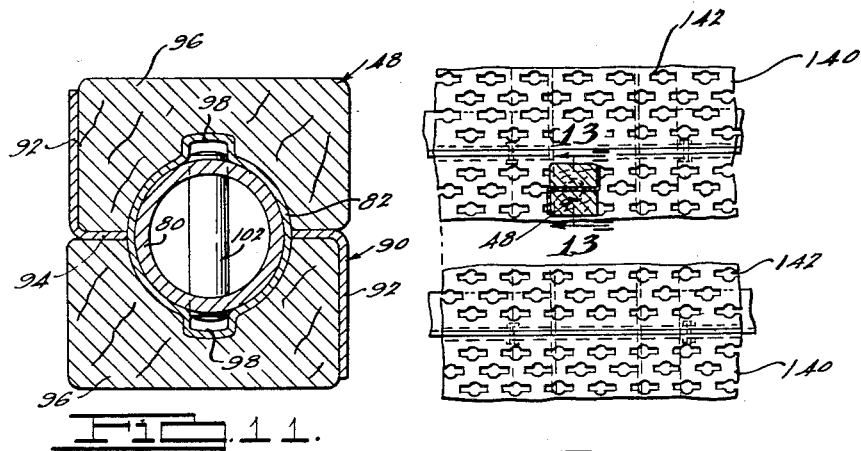
Fig. 11 is a view in vertical section, taken along the line 11—11 of Fig. 7.
Fig. 12 is a fragmentary view illustrating one of several alternative freight loading organizations with which the improved convertible cross bar of the present invention may be used.
Figure 18:
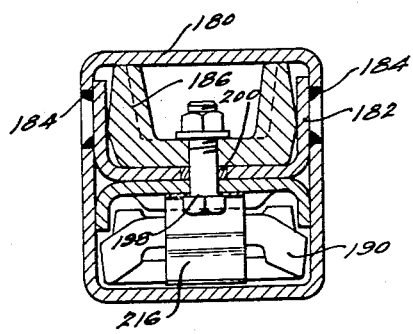
Figure 19:
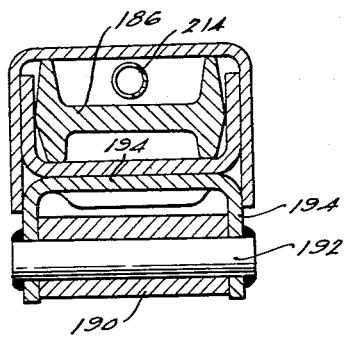
Figure 20:
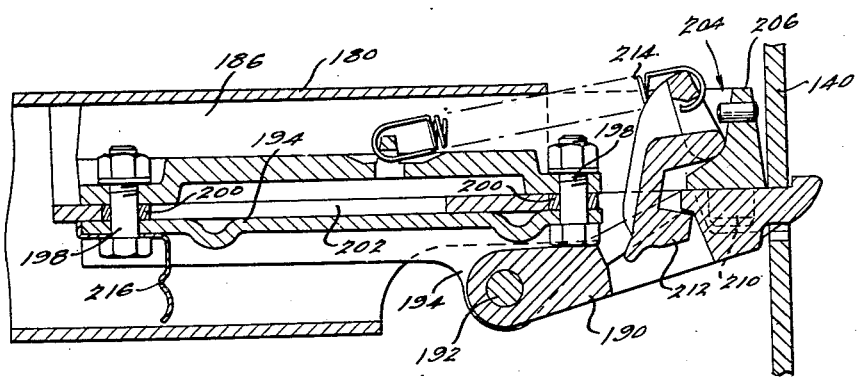

Figs. 18 and 19 are, respectively, views in transverse vertical section, taken along the lines 18—18 and 19—19 of Fig. 17; and, Fig. 20 is a view of the bar shown in Fig. 17, but converted for use with and applied to a wall structure of the general type shown in Fig. 12.

It will be appreciated from a complete understanding of the present invention that the improvements thereof may be embodied in widely differing forms, that certain of the elements or subcombinations found therein may be utilized independently of each other and of the combination as a whole, and that the present convertible bar, though illustrated in connection with only several known alternative forms of general loading structures, may, within the spirit of the invention, be utilized with others. Accordingly, the disclosure herein of specific forms of the invention is to be regarded in an illustrative and not in a limiting sense.

Referring first to Figures 1 through 5, the illustrated railway freight car is, except in respect to the hereinafter described freight loading elements, of generally conventional construction. Generally speaking, it comprises a usual floor structure 20, side walls 22 and 24, a roof structure 26, and end walls 28, one of which is shown in Fig. 1. Although the wall 24 is illustrated as extending uninterruptedly from and to the ends of the car, and the wall 22 is illustrated as being provided with a door opening 30, it will be appreciated that in many instances, both side walls may be provided with door openings.

The structural elements which provide a frame for and support the floor structure 20 form no part of the present invention and are not illustrated herein. The framing structure for the side and end walls of the car primarily comprise the series of longitudinally spaced vertically extending upright intermediate posts 32, corner posts 34, and door posts 36. The side wall posts are shown in Figure 1, it being understood that the intermediate posts for the end wall 28, if used, are concealed behind the usual wooden liner. The roof structure is defined generally by laterally spaced upper rails 38, and interconnecting rafters 40. The side walls and the roof are, of course, sheathed as indicated generally at 42 and 44.

In accordance with the illustrated embodiment of the present invention, the loading organization is of the belt line type, the basic elements of this loading organization being a series of horizontally disposed, longitudinally extending, vertically spaced, side rails 46, arranged at respectively opposite sides of the car, in vertically aligned relation, and a series of adjustable and removable cross bars 48. Important features of the invention described and claimed in a related case now Patent 2,725,826, issued December 6, 1955 have to do with the structure of the side rails 46 per se and their combination with the upright side posts, so as to form integrated and strong, but nevertheless light weight, lattice-like side wall structures for the car. More particularly, each latticed side wall structure is made up of integrally interconnected upright posts 32—34—36 (which extend between and are rigidly connected to the floor and roof structures 20—38) and the series of vertically spaced side rails 46. As most clearly appears in Figs. 2 and 3, each individual side rail extends uninterruptedly from corner post to corner post of the corresponding wall except where interrupted by the previously mentioned door opening 30. As pointed out above, in the illustrated embodiment, the door opening 30 is provided at only one side and it will be understood, accordingly, that if a view corresponding to Figure 2 be based upon the wall 24, it will duplicate Figure 2, except that the door opening 30 and the door posts 36 would be lacking. Each individual side rail 46 is rigidly secured to each of its corresponding side, corner, and door posts 32—34—36. As shown, these rigid connections are effected by welding, the weld points being indicated at 50. It will be understood, of course, that if desired, each individual side rail may be made of an initially continuous length of material or a succession of initially separate lengths. The welded joints between the posts and the side rail portions, of course, integrate these side rail portions.

The side rails 46 resist bending both transversely of and vertically of the car. More particularly, in the illustrated form, the side rails 46 are of angle iron form, having the horizontally extending shelf forming flanges 52, and the vertical flanges 54. As hereinafter described, the door opening 30 may be and preferably is provided with a series of removable side rails 56, which duplicate the rails 46, and are removably connected to the door posts 36.

It will be noticed that the side rails 46 lie immediately inwardly of the car with respect to the posts 32—34—36, and that the flanges 52 project inwardly of the car. Preferably, intermediate buffer panels 58, are secured to the side walls, in the space between adjacent pairs of side rails 46. Preferably, and as illustrated, the inner surfaces of these buffer panels project into the car slightly farther than do the flanges 52. Thus, the buffer panels primarily define the inner wall surfaces and these wall surfaces are free of any freight engaging protuberances, which might otherwise injure freight, either during loading or unloading, or in transit.

It will be appreciated that the major freight-imposed loads, to which a freight car is subjected during transit, are horizontal and lengthwise of the car, these loads being imposed primarily under abrupt starting or stopping conditions. In the present structure, these freight imposed loads are uniformly distributed between all of the upright wall posts, this distribution being effected by the rigid connections between these posts and the side rails. These interconnecting and reinforcing side rails, being provided with the vertically and horizontally extending strength portions (in this case, flanges 54 and 52) are able to withstand substantial loads, both in tension and compression and thus strongly resist buckling in directions either transversely or vertically of the car. Independently, of their function as supports for the cross members 48, accordingly, the present side rails 46 materially strengthen the freight car structure as a whole.

Each door post 36 carries a set of clips 37 which removably receive the vertical flanges of the door rails 56, and support them so that the horizontal flanges thereof are aligned with and constitute continuations of the fixed rails 46. Each door rail 56 may be and preferably is provided with a pair of retractable, spring biased locking pins 57, disposed to be received in apertures provided therefor in the posts 36.

As shown, the posts 36 carry wooden nailing strips 39, which may serve as nailing surfaces to permit a conventional grain door to be fixed in place across the doorway. In applying such a door, the ends thereof may, of course, be notched to accommodate those portions of rails 46 which project over the strips 39.

Coming now to the relation between the side rails 46 and the cross bars 48, the rails are provided with separate holding means, which are distributed in uniformly spaced relation along the length of the rails, so that the cross bars can be applied thereto at any desired point along the length of the car. At the same time, the side rails are of a form which enables them to support the cross bars while they are being moved from one adjusted position lengthwise of the car to another position. This feature materially reduces the work of installing the bars, since it is only necessary for the workman to initially position a cross bar on the rail and thereafter shove it to a desired position. In the preferred and illustrated practice of the invention, these holding means take the form of punched openings 60, and the corresponding holding means provided on the cross bars take the form of slightly tapered pins 62, each end of each cross bar being preferably provided with a pair of these pins 62, the spacing between which is a multiple of (in this case twice), the spacing between adjacent holes 60. Pins 62 have a working fit in holes 60.

Figure 10:
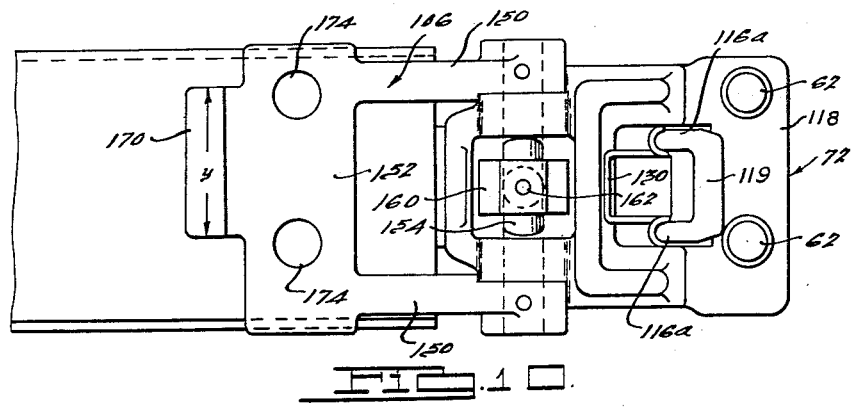
Fig. 10 is a bottom view of the structure shown in Fig. 6.

Coming now to a preferred construction of cross bar, and referring particularly to Figures 1 and 5, through 10, each individual cross bar 48 comprises an intermediate freight engaging body portion 70, and a pair of identical end heads 72 and 74. In order to enable the bar to accommodate itself to varying car widths (which variations may be due either to original manufacturing variations, or to weaving of the car or the like), and in accordance with the invention broadly claimed in Nampa Patent 2,679,214 assigned to the assignee hereof, the heads 72 and 74 are telescopically related to the body 70 of the bar. The telescopic relation may, if desired, be employed in connection with only one of the heads 72 and 74, in which event the non-telescopic head may be rigidly secured to the body 70. Only the heads 72 are shown in the more detailed figures, Figures 5 through 10.

As herein illustrated, each head 72 is a forging, one end 76 whereof is rigidly secured, as by welding as indicated at 78, to a cylindrical sleeve 80. Sleeve 80 is slidably received in an outer sleeve 82 which in turn is rigidly connected to the body of the bar. As best seen in Figure 11, the body of the bar is primarily defined by a reinforcing Z-bar 90, having vertically extending flanges 92 and a web 94. Buffer bars 96 are rigidly secured in place on either side of the web 94 and serve to define relatively soft freight-engaging surfaces all the way around the bar.

The outer sleeve 82 may be and preferably is formed from an initially plane sheet of material which is first acted upon to define the axially extending grooves 98, and is thereafter rolled up into cylindrical form and introduced into a notch provided therefor in the web 94. The meeting edges of the sleeve 82 receive the web 94 between them, and the web-to-sleeve connections are completed by welding (not shown). The sleeve 82 thus defines a cylindrical bore to receive the sleeve 80 and also defines the guide grooves 98. Sleeve 80 carries a drive pin 102 which limits the telescoping movement between the parts. Assembly of the parts is completed by introducing sleeve 80 into sleeve 82 a short distance, and thereafter inserting the drive pin 102 through each of the oppositely disposed but aligned apertures 104 in sleeve 82, this operation being performed, of course, while the hereinafter described adapter arm 106 is swung out of interfering relation.

Viewed in plan, each head 72 defines an opening which is roughly rectangular, having a forward wall 110, a rear wall 112, and laterally spaced side walls 114. The opening defined by these walls receives the hereinafter described spring-biased, locking member or latch 116. The generally flat under side 118 of the forward wall 110, is disposed to directly bear upon the horizontal flange 52 of the corresponding side rail 46; and is provided with the two previously mentioned holding pins 62.

The previously identified latch 116, the nose 119 whereof underlies the flange 52 of the associated rail, is loosely journaled in the head 72, and is biased to a latching position by a spring 120 and also by gravity as can be readily seen in Fig. 7. More particularly, the latch is generally hook-shaped, as viewed in Fig. 13, and comprises the nose 119 and the bearing portion 122. Portions 119 and 122 are interconnected by laterally spaced legs 116a. The bearing portion 122 is loosely journaled in a bearing defined by the inner surface 110a of the front wall 110, and a pair of laterally spaced lugs 124 which project inwardly from the side walls 114. A drive pin 123 blocks removal of the latch from the bearing 110—124.

Laterally spaced arms 126 project upwardly and rearwardly from the ends of the bearing portion 122, and are bridged at their outer ends by a connecting portion 128. Spring 120 is illustrated as being formed from a continuous length of spring wire bent upon itself to define a bight 130, which bears against the rear wall 112, and has spaced upwardly extending legs 132. These legs 132 extend over, around, and under the connecting portion 128 and the extreme ends thereof are hooked behind the leg portions 116a. From the foregoing, it will be appreciated that the latch 116 may readily be swung in a clockwise direction as viewed in Figure 7, from the holding position shown therein, to a position in which it does not interfere with a movement of the pins 62 into or out of the openings 60. The spring 120 only lightly opposes such a clockwise rotative force applied to the latch 116. On the other hand, the latch positively resists vertical forces applied to the bar 70, tending to lift it away from the rails. This is because of the hook-like character of the latch and the location of its axis of pivot.

In applying a bar between the rails 46, the latches 116 associated with the heads thereof are, of course, swung by hand to inactive position, and the bar is thereupon laid upon the shelves or flanges 52. Because of the free telescopic connection, the heads 72 may readily be moved to a position in which, though the bar is supported by the rails 46, the spacing between the pins 62 at one end of the bar and those at the other end of the bar differs from the lateral spacing between the holes 60 in the rails 46 at opposite sides of the car. Under these conditions, while supported on the rails by its two pins 62, the cross bar 48 may readily be slid along the rails 46 until the desired position of adjustment is reached, after which the telescopic connection may be adjusted slightly, enabling the sets of pins 62 to drop into their respective holes 60. In this use, the provision of two or more pins such as 62 prevents rolling over of the bar while thus supported. Thereafter, the latches 116 may be released, at which time they assume the latching position under the influence of gravity and of their biasing springs 120.

Alternatively, the bar 48 may be laid upon the rails 46, with the latches 116 in active position, in which event the under sides 119a of the noses 119 rest upon the rails and support the bar during sliding and adjusting movement lengthwise of the car. When the desired position of adjustment is reached, the latches 116 may be retracted or the bar pushed or pulled down, allowing the bar to drop into a selected locked position. Both the surface 119a and the inclined surfaces 119b on the head 72 will if resting on rail flange 52 tend to cam the head inwardly in a direction tending to cause the pins 62 to drop in holes 60.

It will be apparent that the general use and the flexibility of the present freight bracing or loading apparatus and its ability to support freight against longitudinal displacement in the car, support freight in tiers or decks, and subdivide it into various compartments are essentially or generally the same as that disclosed in the copending application, now Patent 2,679,214, issued May 25, 1954, of the present applicant Nampa, and hence this common mode of general operation and its advantages need not be repeated here.

In freight loading systems of the general type disclosed, i. e., in which a freight engaging member, such as a cross bar or its retaining means, is held in a selected adjusted position along the car side walls by a positive type of securing means such as interengaging teeth or the engagement of one or more pins or projections in holes or recesses carried by the car side walls, a coarse or relatively wide pitch or spacing of these positive type securing means along the side wall members is desirable to achieve simplicity, lower cost, and in some respects, greater sturdiness. In many and perhaps in most types of loads, only a relatively coarse pitch spacing or fineness of adjustment is required. However, in certain types of freight loads a finer pitch or adjustment is desirable. Hence, there is a need for a pitch splitting arrangement or a means to subdivide the normal pitch spacing when necessary which is of low cost, retains the simplicity and sturdiness of the original system, and which does not introduce any additional movable elements or extra connections or engaging surfaces. Such arrangements are provided by the invention of the present applicant Dunlap as set forth in a related copending case Serial No. 545,195, filed November 7, 1955 in which it will be apparent that while the preferred utility of the pitch reducing arrangement is in the adjustments longitudinally of the car yet its use in other adjustments such as vertical, is within its broader purview as is the utilization of the present principles of pitch splitting in connection with securing means other than pins or projections received in holes and in connection with members other than the present securing means or pins 62 engaged simultaneously.

Coming now to the pitch splitting feature of the present invention, it will be noticed that though the pins 62 are approximately symmetrically arranged with respect to the longitudinal axis of the bar for a substantially symmetrical loading of the bar, but considered as a pair they are non-symmetrical by one-quarter of the spacing between adjacent rail holes 60, the offset being in the same direction at both ends of the bar. Accordingly, considering two particular pairs of holes 60 at opposite sides of the car, the position of the bar body, lengthwise of the car, can be varied one-half of the pitch or spacing of adjacent holes 60 by turning it end for end to thus in effect add or subtract the one-quarter pitch offset. This pitch splitting feature, of course, has the effect of halving the pitch or hole spacing or, stated otherwise, has the effect of increasing, in this instance, doubling the number of adjusted positions which could otherwise be obtained with a given number of holes 60.

In the more generic aspects of the aforesaid pitch-splitting feature, it will be noted that the bar may be manipulated relative to each rail so that either one of two pairs of pins engages a particular pair of rail holes, the position of the bar lengthwise of the car being determined by the choice as to which of the two pairs of pins shall be engaged in the rail holes. In this embodiment, the pairs of pins are located at the respectively opposite ends of the bar. In another of the many possible variations of this inventive concept, each end of the bar is provided with a plurality of pairs of pins, and the pitch splitting adjustment is effected by rotating the bar about its own axis to bring a selected pair of pins into active position. A consideration of the foregoing disclosure will make it clear that this interpitch adjusting arrangement can be employed to reach any position between the normal pitch spacings although the system is disclosed and is preferably used for sub-adjustments which are even sub-multiples (such as a half, third, fourth, etc.) of the main pitch spacing which is preferably, but not necessarily, uniform.

Although the pins 62 are in slightly non-symmetrical relation with respect to the axis of the bar, it is to be noted that these pins are relatively widely separated and so have a broad bearing on the rail 46 and give a high degree of end restraint. Accordingly, the various types of loads applied to the bar have little or no tendency to cock it or rock it about its axis. Even though this broad bearing is provided also, it is to be noted that the entire structure of each head 72—74 lies within the confines of the bar body. Thus, the bar heads never interfere with freight articles which may extend, toward the car wall, beyond the ends of the bar body 70. Injury to freight articles by the heads is thus effectively prevented.

As thus far described, the bars 48 are raised to cooperate with side wall structures of the previously described belt-line type wherein the supporting rails are provided with pin receiving apertures. As previously pointed out, an important feature of the present invention resides in arranging the bars 48 so that they can readily be converted for use with other types of supporting structures. United States Patents Nos. 2,091,869, granted August 31, 1937, to McCurdy and 2,030,773, granted February 11, 1936, to Thomas are illustrative of a commonly encountered such alternative type of bar supporting structure.

Figure 13:
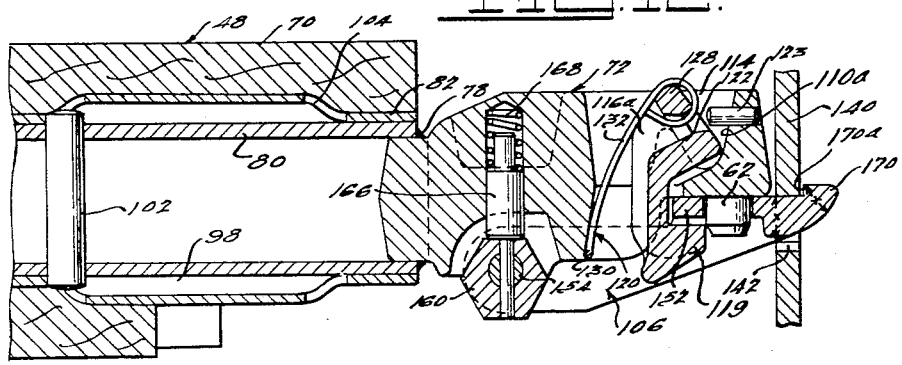
Fig. 13 is a fragmentary view in vertical section, showing the cross bar of Fig. 5 in condition for use with a wall structure of the type shown in Fig. 12.

In these arrangements, the car walls are either partly or entirely covered with apertured structures, either fixedly or adjustably positioned, and the apertures in which are adapted to receive retractable pin arrangements carried at the ends of the bar. Figure 12 illustrates fragmentarily a portion of a car wall structure, arranged in accordance with said Thomas patent. In this figure, a metallic lining 140 is provided, which lining is provided with horizontally extending rows of spaced keyhole-like apertures 142, these rows being spaced vertically and the apertures in alternate rows being vertically arranged in staggered relation to give an adjustment between the pitch of one row by moving the bar down or up one row. Such a wall structure is shown in Figures 13 and 14. There is and has been a decided need in the freight loading industry for a, so to speak, universal bar, which can be utilized in cars provided with any of a variety of side supporting structures. This need is well filled by the bar of the present invention.

Further, in the cross bars now usually employed with perforated wall types of cars as exemplified by the above-mentioned McCurdy and Thomas patents, there is no anti-pull-out retaining means. Such anti-pull-out means as have been proposed are believed to have been impractical. Hence these bars now commonly used with such perforated wall cars do pull out permitting the bars to drop during adjustment or in transit due to inaccuracies or to changes in the car widths due to weaving or bulging of the car side walls. Thus there is also a need for a practical and efficient anti-pull-out means which is easy to use and substantially fool-proof. This need applies, not only to, so-called, universal bars but to other types including bars designed or intended for use only in the perforated wall type cars. This need is also met by the present invention and the present arrangement of the retaining member with its anti-pull-out portion on a swinging support (as embodied in adapter 106) may be employed to advantage in bars designed only for perforated wall type cars.

More particularly, and referring now particularly to Figures 7 through 10 and 13 and 14, each of the heads 72 (and, of course, the heads 74) is provided with one of the previously but briefly referred to adapters 106. Each adapter 106 is, as viewed in Figure 10, of general U-shaped form, having laterally spaced legs 150 and a connecting bight or bridge 152, the thickness of which is approximately that of the flange 52 of the previously described rails 46. The outer ends of the legs 150 are apertured to receive a pivot pin 154, which is rotatably journaled in bearing openings provided therefor in bosses 156 which project downwardly from the previously identified rear wall 112. Drive pins 158 hold the shaft 154 and the adapter 106 in assembled relation to each other and to the bosses 156.

In accordance with the present invention, means are provided to releasably, but fairly positively, hold the adapter in the retracted out of the way position of Figure 7, and to lightly bias it to the preliminary or cocked positions indicated at b and c in Figure 14, and the active position shown in Figure 13. In the illustrated embodiment, this detent holding relation is achieved by providing the shaft 154 with a hexagonal cam 160, held in place by a drive pin 162. Only four sides of the cam 160 are active, the six sided relation being preferred to enable the same cam to be used in connection with heads at either end of the bar.

A reinforcing rib 164 extends rearwardly from the rear wall 112 and is bored from the under side to receive a holding pin 166 and a biasing spring 168. In the position shown in Figure 7 the pin 166, of course, bears upon the highest one of the flats on cam 160 and yieldingly holds the adapter 106 in the illustrated position. Similarly, the pin 166 bears in succession against the next two flats to yieldingly hold the adapter 106 in, respectively, the positions marked b and c in Figure 14. Finally, the pin 166 bears against the flat opposite to the one shown in Figure 7, to yieldingly hold the adapter in the active position of Figure 13.

In the active position of Figure 13, the engaging or retaining portion of the offset nose 170 of the adapter extends through a corresponding opening 142 in the wall panel 140, and a portion of the nose lies behind and in holding or anti-pull-out relation to the wall panel 140. In this position, also, the pins 62 on head 72 project (with a working fit) through openings 174 provided therefor in the adapter bridge 152, and the upper surface of the adapter bridge bears directly against the previously identified flat under side 118 of the front wall 110 of the head 72 while the aforementioned latch 116 fits under the bridge 152 to lock it and the head 72 together so that the adapter 106 cannot be swung about pivot 154 until the latch 116 is released as previously described. The openings 174 are slightly elongated to permit entry of the pins 62 during the swinging movement of adapter 106. With this relation, it will be appreciated that vertical loads applied to the bar are transmitted directly from the adapter bridge and head engaging surfaces and are not required to be transmitted, in any large part, through the pivotal connection between the head and the adapter. Similarly, loads applied to the bar longitudinally of the freight car, are transmitted directly from the pins 62 to the adapter 106, thereby in a large part, if not entirely, eliminating these loads from the pivotal connection between the adapter and the head.

The nose 170 is offset laterally from the bar axis to provide the aforesaid pitch-splitting feature. As before, the offset is a sub-multiple of the spacing between two adjacent holes 142 in vertically spaced and adjacent rows. This arrangement is preferred here in view of the pitch reduction permitted by lowering or raising the bar one row in the alternately offset rows of these perforated wall cars.

In applying a bar 48 to a wall structure of the type shown in Figure 12, the action is substantially as illustrated in Figure 14. In this figure, in the uppermost position, the heads 72 are telescoped outwardly to a point where they are immediately adjacent, or may in fact engage, the wall panels 140, and the adapters 106 are swung downwardly to points where the noses 170 are just ready to enter a corresponding pair of apertures 142. If now the bar is lowered slightly the adapters may be swung out, advancing the noses 170 through the apertures 142 and bringing the shoulders 170a behind and in holding relation to the panel 140.

While the adapters may be arranged to swing into locking or engaging position as the bar is raised, yet the presently disclosed arrangement is preferred since in use it is easier to lower the bar permitting the adapters to swing into engaging position.

Thereafter the bar may be lowered into place, during which movement the adapters swing about their pivot pins 154. During the course of this movement, these pins 154, of course, follow an arcuate path, such action being permitted by the telescopic connection or connections between the heads 72. This arcuate path is shown in somewhat exaggerated fashion in Figure 14, position c being approximately at the inner limits of the telescopic adjusting movement.

It will be noticed that when the bar is in place, the noses 170 substantially entirely fill the openings 142 leaving only the small semi-circular enlargements at the tops and bottoms. If desired, of course, the noses 170 may be provided with ridges to fill these semi-circular spaces.

The full use of the entire horizontal and vertical surfaces of the openings 142 materially increases the load bearing capacity of the panels 140, as will be understood. This full use is permitted by the configuration of the noses 170, it being noticed that the dimensions indicated at X in Figure 13 are just slightly less than the vertical heights of the aperture 142. The width of the noses 170 indicated at Y in Figure 10 is, of course, just slightly less than the length of each opening 142. The just-mentioned differences need be, of course, only large enough to allow for reasonable manufacturing tolerances. Similar considerations make it preferable to allow for a small gap between the shoulder 170a and the panel 140, when the parts occupy the position of Figure 13.

It will be appreciated from the foregoing that the connections between the adapters 106 and the side panels 140 are such that the bars, after being installed as aforesaid, cannot be removed except by a reversal of the action described with respect to Figure 14. The noses 170 by lying behind the panels 140, positively prevent any tendency of the wall spacing to change in transit, due to weaving or other causes, causing the adapter to pull out of the holes, and drop the bars. This is a difficulty frequently encountered with conventional cross bars.

Moreover, the aforesaid connections between the adapters 106 and the openings 142 establishes what will be recognized as an end-restraint connection between the bars 48 and the side wall structure. This end restraint connection, of course, materially increases the beam loading capacity of the organization, since beam loads, instead of being borne entirely by the bar structure, are distributed to the wall structures. This same advantage of end-restraint is, of course, achieved with the bar when used as shown in Figure 5, and is provided by the closely fitting pins 62 and apertures 60.

The simplified embodiment of Figures 15–16 is like that of Figure 7 except that it does not include the adapter 106 and so is not convertible. Similar reference characters indicate corresponding parts and it is thought that no further description of Figures 15–16 is needed.

Figures 17 through 19 illustrate a modified bar construction, arranged for use with side rails such as 46, and Figure 20 shows the same bar converted for use with a wall panel structure such as is shown in Figure 12.

Referring particularly to Figures 17, 18, and 19, the body 180 of the bar is of generally boxlike form. Near each end, the body 180 is provided with an insert in the form of a channel member 182, the flanges of which are welded to the bar body as indicated at 184. In this instance, the head comprises an elongated H-shaped forging 186, the rear portion of which is of channel shape and is slidably received in and guided by the previously mentioned channel 182.

The adapter 190 is pivotally connected, by a pin 192, to a generally downwardly presenting channel-shaped member 194, which is slidably received in the bar body, and the web of which lies in surface engagement with the web of the fixed channel 182. Bolts 198 interconnect the forging 186 and the lower member 194. Washers 200 are carried by these bolts, and are approximately the thickness of the web of the channel 182. One of these washers and its corresponding bolt ride in a longitudinal slot 202 provided in the web of the channel 182. The other washer, in the position shown in Figure 17, abuts the end of the web of the member 182. With this relation, it will be appreciated that telescopic movement between the head structure 204 and the bar body 180 is permitted. As before, this sort of a telescopic connection may be and preferably is utilized at both ends of the bar. If it is to be utilized at only one end, the head structure may be locked in place relative to the channel 182.

The outer end of the head 204 defines a wall 206, having a flat under side 208, and pins 210, which cooperates with an associated side rail 46 in the previously described manner. Additionally, the head 204 may be provided with a latch 212, biased to active position by a tension spring 214.

In further accordance with the present invention, the adapter 190, normally held in the retracted position by a holding spring 216, may be swung to the position of Figure 20 for cooperation in the previously described manner with wall panel 140. In this instance, also when in the active position, loads are transmitted directly between the adapter 190 and the nose 206 of the head 204, thus largely relieving the pivot 192 of such loads.

Although only several embodiments are disclosed in detail in this specification taken with the drawings, it is to be understood that various modifications and other forms of the invention may be employed within the scope of the appended claims.

The present application is a division of applicants' co-pending applications, Serial No. 51,272, filed September 25, 1948 (now Patent 2,497,683) and Serial No. 119,942, filed October 6, 1949 (now Patent 2,725,826), assigned to the assignee hereof.

We claim:

1. A freight holding member adapted to span a freight chamber and detachably connect to either of two different types of securing means either of which may be positioned along the inner walls of said chamber, one of said means comprising perforations in the walls and the other rail means on the walls, said member having a head at each end, each head having a wall engaging means adapted to enter said perforations and engaging means adapted for operative connection to the rail means, one of said engaging means being movable between an operative position and an inoperative position, and means embodied in each head for selectively holding said engaging means in said inoperative position.

2. The structure of claim 1 in which said heads are relatively adjustable lengthwise of the member to accommodate varying spacings between said securing means.

3. A freight holding member adapted to span a freight chamber and detachably connect to either of two different types of securing means either of which may be positioned along the inner walls of said chamber, one of said means comprising perforations in the walls and the other rail means on the walls, said member having a head at each end, each head having two types of engaging means one of which is movably mounted with respect to the other and adapted to enter said perforations when in an operative position and the other being adapted to engage said rail means, said one engaging means underlying the other when in said operative position so that it precludes use of the other to engage said rail means but being movable to an inoperative position in which it permits such use of the other.

4. The organization of claim 3 in which the said other engaging means for said rail means includes means immovably mounted on the head.

5. A freight holding bar adapted to span a freight chamber and detachably connect to either of two different types of securing means either of which may be positioned along the inner walls of said chamber, one of said means comprising perforations in the walls and the other rail means on the walls, said bar having a head at each end, each head having a first type of engaging means therein for cooperation with said rail means, an adapter member movable to operative and inoperative positions carried by each said head and having thereon a second type of securing means which is, when in operative position, supported by said first engaging means, said second type means being adapted to enter said perforations.

6. The organization of claim 5 in which said adapter is mounted to swing about an axis transverse to the length of said bar.

7. The organization of claim 5 in which said adapter is mounted to swing about an axis transverse to the length of the bar and spaced inwardly from the free end of the head.

8. The organization of claim 5 in which said adapter is mounted so that it extends beyond the free end of the head when in operative position, thus increasing the effective length of the bar.

9. A freight holding bar adapted to span a freight chamber and detachably connect to either of two types of securing means either of which may be positioned along the inner walls of said chamber, one of said means comprising perforations in the walls and the other rail means on the walls, said bar having a head at each end, each head having two types of engaging means corresponding respectively to said different types of securing means, one of said engaging means being adapted to enter said perforations and mounted on said head to swing toward and away from the other engaging means about an axis transverse to the length of said bar and for movement into and out of active position and the other of said engaging means being adapted for operative connection to said rail means.

10. The organization of claim 9 in which said movably mounted engaging means is in its operative position, supported by said other engaging means.

11. The organization of claim 9 in which said one engaging means is mounted so that, when in operative position, it extends beyond the other engaging means, thus increasing the effective length of the bar.

12. The organization of claim 9 in which at least one of said heads is mounted for limited, free telescopic motion aixally of the bar.

13. The organization of claim 9 in which both of said heads are mounted for limited, free telescopic motion axially of the bar.

14. A freight supporting cross bar adapted to span a freight chamber and detachably connect to either of two different types of means on opposite sides of said chamber for detachably receiving said cross bar, one of said means comprising perforations of predetermined shape in said sides, said cross bar having a head at each end, each head having a member shaped to enter said perforations and mounted on the head and movable lengthwise of the bar to an operative position beyond the end of the head wherein it can enter said perforations and to an inoperative position inwardly of the end of said head wherein it cannot enter said perforations, each head having a second member thereon adapted to be operatively connected to the other type of means when said first member is in said inoperative position.

15. The invention set forth in claim 14 including a common latch mounted on each head and operative with each of said members to hold said cross bar locked to each of said means.

References Cited in the file of this patent
UNITED STATES PATENTS

| | | |
|---|---|---|
| Re. 20,860 | Thomas | Sept. 13, 1938 |
| Re. 24,118 | Fahland | Feb. 7, 1956 |
| 1,597,091 | McMahan | Aug. 24, 1926 |
| 2,091,869 | McCurdy | Aug. 31, 1937 |
| 2,268,394 | Hebert | Dec. 30, 1941 |
| 2,294,795 | Moses | Sept. 1, 1942 |
| 2,466,728 | Nampa | Apr. 12, 1949 |
| 2,497,683 | Nampa et al. | Feb. 14, 1950 |
| 2,556,302 | Stough et al. | June 12, 1951 |
| 2,679,214 | Nampa | May 25, 1954 |
| 2,725,826 | Tobin et al. | Dec. 6, 1955 |